(12) United States Patent
Xiao et al.

(10) Patent No.: US 10,997,078 B2
(45) Date of Patent: May 4, 2021

(54) METHOD, APPARATUS, AND NON-TRANSITORY READABLE MEDIUM FOR ACCESSING NON-VOLATILE MEMORY

(71) Applicant: Huawei Technologies Co., Ltd., Shenzhen (CN)

(72) Inventors: Shihai Xiao, Moscow (RU); Lei Fang, Hangzhou (CN); Florian Longnos, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/455,466

(22) Filed: Jun. 27, 2019

(65) Prior Publication Data

US 2019/0324914 A1   Oct. 24, 2019

Related U.S. Application Data

(63) Continuation of application No. PCT/CN2016/112699, filed on Dec. 28, 2016.

(51) Int. Cl.
| | |
|---|---|
| *G06F 12/0862* | (2016.01) |
| *G06F 12/1009* | (2016.01) |
| *G06F 12/0831* | (2016.01) |
| *G06F 12/1045* | (2016.01) |

(52) U.S. Cl.
CPC ...... *G06F 12/0862* (2013.01); *G06F 12/0831* (2013.01); *G06F 12/1009* (2013.01); *G06F 12/1054* (2013.01)

(58) Field of Classification Search
CPC ............. G06F 12/0862; G06F 12/0831; G06F 12/1009
See application file for complete search history.

(56) References Cited

U.S. PATENT DOCUMENTS

| | | | |
|---|---|---|---|
| 9,262,336 B2 | 2/2016 | Hyuseinova et al. | |
| 9,594,693 B2* | 3/2017 | Sutardja | G06F 3/0638 |
| 2010/0011156 A1* | 1/2010 | Yim | G06F 12/0246 |
| | | | 711/103 |

(Continued)

FOREIGN PATENT DOCUMENTS

| | | |
|---|---|---|
| CN | 105354152 A | 2/2016 |
| CN | 105786721 A | 7/2016 |
| CN | 105786722 A | 7/2016 |

OTHER PUBLICATIONS

Shaohe, Feng, "Linux Page Table Analysis", IBM China Linux and Virtualization Lab Blog, Aug. 11, 2014, 4 pages; Retrieved from the internet: https://www.ibm.com/developerworks/community/blogs/5144904d-5d75-45ed-9d2b-cf1754ee936a/entry/linux_%25e9%25a1%25b5%25e8%25a1%25a8%25e5%2588%2586%25e6%259e%2590?lang=en.

*Primary Examiner* — Ryan Bertram
*Assistant Examiner* — Edmund H Kwong
(74) *Attorney, Agent, or Firm* — Slater Matsil, LLP

(57) ABSTRACT

A method for accessing a non-volatile memory comprises that an NVM controller receive a first access request from a processor and determines whether the first access request is used to access a page table. If the first access request is used to access the page table, the NVM controller obtains an AIT entry by reading a page table entry indicated by the first address information and caches the AIT entry to an AIT cache. The NVM controller monitors access of the processor to the page table, prefetches the to-be-accessed AIT entry.

20 Claims, 4 Drawing Sheets

(56) References Cited

U.S. PATENT DOCUMENTS

2012/0192035 A1* 7/2012 Nakanishi ........... G06F 11/1048
                                                            714/766
2013/0282967 A1  10/2013 Ramanujan
2013/0318288 A1  11/2013 Khan et al.
2014/0156930 A1*  6/2014 Isloorkar ............ G06F 12/1027
                                                            711/122
2015/0347312 A1* 12/2015 Lee .................... G06F 12/0246
                                                            711/102

* cited by examiner

METHOD, APPARATUS, AND NON-TRANSITORY READABLE MEDIUM FOR ACCESSING NON-VOLATILE MEMORY

CROSS-REFERENCE TO RELATED APPLICATIONS

This application is a continuation of International Patent Application No. PCT/CN2016/112699, filed on Dec. 28, 2016, the disclosure of which is hereby incorporated by reference in its entirety.

TECHNICAL FIELD

Embodiments of the present invention relate to the computer field, and in particular, to a method, an apparatus, and a system for accessing a non-volatile memory.

BACKGROUND

A memory of a host is always an important component of a computer system, and is a critical part that shapes system performance. A conventional memory always includes a dynamic random access memory (DRAM). A biggest weakness of the memory including the DRAM is that the memory is volatile. Once the host is powered off, data stored in the DRAM is lost, and a problem of unrecoverable data loss occurs. This poses a great challenge to consistency and reliability of the data. To overcome this disadvantage of the memory, an additional complex data power-off protection measure usually needs to be used. In addition, due to a physical characteristic of the DRAM, the DRAM needs to perform a data refresh operation at particular intervals to avoid data loss. This directly causes extremely high power consumption of the DRAM.

Non-volatile memories (NVM) such as a phase change memory (PCM), a magnetoresistive random-access memory (MRAM), a ferroelectric memory (ferroelectronic RAM, Fe_RAM), and a flash memory gradually become a trend. The NVM is non-volatile when power is off, have high storage density, no need to frequently refresh, and low power consumption, and other advantages. However, an access technology for the NVM is not mature. When a translation lookaside buffer (TLB) miss occurs, it usually takes a processor a relatively long time to access the NVM.

SUMMARY

In view of this, the present invention discloses a method, an apparatus, and a system for accessing a non-volatile memory (NVM), to reduce a memory access delay by caching a to-be-accessed address indirection table (AIT) entry to an AIT cache.

According to a first aspect, this application discloses a method for accessing a non-volatile memory. The method includes: receiving, by an NVM controller, a first access request from a processor; determining, based on first address information carried in the first access request, whether the first access request is used to access a page table; and if the first access request is used to access the page table, reading, by the NVM controller, a page table entry indicated by the first address information, obtaining, based on second address information recorded in the page table entry, an AIT entry corresponding to the second address information from an AIT, and caching the AIT entry to an AIT cache.

The second address information may be a physical page number, used to indicate a physical page to be accessed by the processor. The AIT is used to record a mapping relationship between a physical address and an NVM device address. More specifically, the AIT is used to record a mapping relationship between a physical block number and an NVM inner block number. The NVM controller monitors access to the page table. If an AIT entry corresponding to a physical page number recorded by an accessed page table entry does not exist in the AIT cache, the NVM controller prefetches one or more AIT entries corresponding to the physical page number, and caches the one or more AIT entries to the AIT cache. Subsequently, the NVM may directly obtain, from the AIT cache, an NVM inner block number corresponding to a to-be-accessed physical block number.

According to the first aspect, in a first possible implementation of the first aspect, the method further includes: sending, by the NVM controller, the second address information to the processor; receiving a second access request from the processor, where the second access request carries the second address information; and obtaining, by the NVM controller based on the second address information and the AIT entry in the AIT cache, an NVM device address corresponding to the second address information, and accessing the NVM based on the NVM device address corresponding to the second address information.

More specifically, the second access request carries third address information. A partial field of the third address information is the second address information. The third address information is a physical address to be accessed by the processor, and the second address information is a physical page number. The NVM device address corresponding to the second address information is an NVM inner block number. The NVM controller obtains, based on the physical page number and the AIT entry in the AIT cache, an NVM inner block number corresponding to the physical page number, and accesses the NVM based on the NVM inner block number and a partial field of the third address information.

According to the first possible implementation of the first aspect, in a second possible implementation of the first aspect, the method further includes: determining, by the NVM controller based on the second address information, whether the second access request is used to access the page table; and if the second access request is used to access the page table, deleting, by the NVM controller, the AIT entry corresponding to the second address information from the AIT cache after obtaining the NVM device address corresponding to the second address information.

If both the first access request and the second access request are used to access the page table, it indicates that the page table is a multi-level page table. For access to the page table, after the access to the page table, a final correspondence between a virtual page number and the physical page number is cached in a TLB, so that reusability of the previously cached AIT entry is not high. To save an AIT cache space, the AIT entry corresponding to the second address information may be deleted from the AIT cache. It should be understood that deletion herein may be invalidating the page table entry or replacing the page table entry in next cache replacement.

According to any one of the first aspect or the foregoing possible implementations of the first aspect, in a third possible implementation of the first aspect, before the determining, by the NVM controller, whether the first access request is used to access a page table entry, the method further includes: receiving, by the NVM controller, page table address information from the processor. The NVM controller determines, based on the first address information and the page table address information, whether the first access request is used to access the page table.

Specifically, the page table address information includes a page table base address and a page table size. The NVM controller may determine an address range of the page table based on the page table base address and the page table size. The NVM controller may determine whether the first access request is used to access the page table by determining whether the first address information falls within the address range of the page table.

According to any one of the first aspect or the foregoing possible implementations of the first aspect, in a fourth possible implementation of the first aspect, the method further includes: receiving, by the NVM controller, page table invalidity information from the processor, and invalidating the page table address information based on the page table invalidity information.

After destructing a process, the processor sends a page table invalidity message to the NVM controller. After receiving the page table invalidity message from the processor, the NVM controller invalidates page table address information related to the process. In this way, a storage space on an NVM controller side is saved.

According to a second aspect, this application provides a readable medium, including an execution instruction. When a processor of a memory controller executes the execution instruction, the storage controller performs the method according to any one of the first aspect or the possible implementations of the first aspect.

According to a third aspect, this application provides an NVM controller, including a processor, a memory, and a bus. The memory is configured to store an execution instruction. The processor and the memory are connected by using the bus. When the NVM controller runs, the processor executes the execution instruction stored in the memory, so that the NVM controller performs the method according to any one of the first aspect or the possible implementations of the first aspect.

According to a fourth aspect, this application provides an apparatus for accessing a non-volatile memory. The apparatus includes: a receiving unit, configured to receive a first access request from a processor, where the first access request carries first address information; a determining unit, configured to determine, based on the first address information, whether the first access request is used to access a page table; and a processing unit, where if the first access request is used to access the page table, the processing unit is configured to: read a page table entry indicated by the first address information, obtain, from an address indirection table AIT based on second address information recorded in the page table entry, an AIT entry corresponding to the second address information, and cache the AIT entry to an AIT cache, where the AIT is used to record a mapping relationship between a physical address and an NVM device address.

According to the fourth aspect, in a first possible implementation of the fourth aspect, the apparatus further includes a sending unit, configured to send the second address information to the processor. The receiving unit is further configured to receive a second access request from the processor, where the second access request carries the second address information. The processing unit is further configured to: obtain, based on the second address information and the AIT entry in the AIT cache, an NVM device address corresponding to the second address information, and access the NVM based on the NVM device address corresponding to the second address information.

According to the first possible implementation of the fourth aspect, in a second possible implementation of the fourth aspect, the determining unit is further configured to determine, based on the second address information, whether the second access request is used to access the page table; and if the second access request is used to access the page table, the processing unit is further configured to delete the AIT entry from the AIT cache after obtaining the NVM device address corresponding to the second address information.

According to any one of the fourth aspect or the foregoing possible implementations of the fourth aspect, in a third possible implementation of the fourth aspect, the receiving unit is further configured to receive page table address information from the processor; and the determining unit is configured to determine, based on the first address information and the page table address information, whether the first access request is used to access the page table.

According to the third possible implementation of the fourth aspect, in a fourth possible implementation of the fourth aspect, the receiving unit is further configured to receive page table invalidity information from the processor; and the processing unit is further configured to invalidate the page table address information based on the page table invalidity information.

The fourth aspect provides apparatus implementations corresponding to the method according to the first aspect, so that descriptions according to any one of the first aspect or the possible implementations of the first aspect are correspondingly applicable to any one of the fourth aspect or the possible implementations of the fourth aspect. Details are not described herein again.

According to a fifth aspect, this application provides a system for accessing a non-volatile memory. The system includes a processor, a non-volatile memory NVM, and the apparatus for accessing a non-volatile memory according to any one of fourth aspect or the possible implementations of the fourth aspect.

According to the technical solutions disclosed in embodiments of the present invention, the NVM controller monitors access of the processor to the page table. When obtaining a request of the processor for accessing the page table, the NVM controller parses content of the page table to obtain a physical page number that may be subsequently accessed, prefetches an AIT entry corresponding to the physical page number from the AIT before the processor really accesses the physical page number, and caches the prefetched AIT entry to the AIT cache. In this way, subsequent AIT cache misses are reduced, thereby increasing a data access speed of the NVM.

BRIEF DESCRIPTION OF THE DRAWINGS

To describe the technical solutions in embodiments of the present invention more clearly, the following briefly introduces the accompanying drawings required for describing the embodiments. Apparently, the accompanying drawings in the following description show merely some embodiments of the present invention, and persons of ordinary skill in the art may still derive another drawing from these accompanying drawings without creative efforts.

DETAILED DESCRIPTION OF ILLUSTRATIVE EMBODIMENTS

Figure 1:
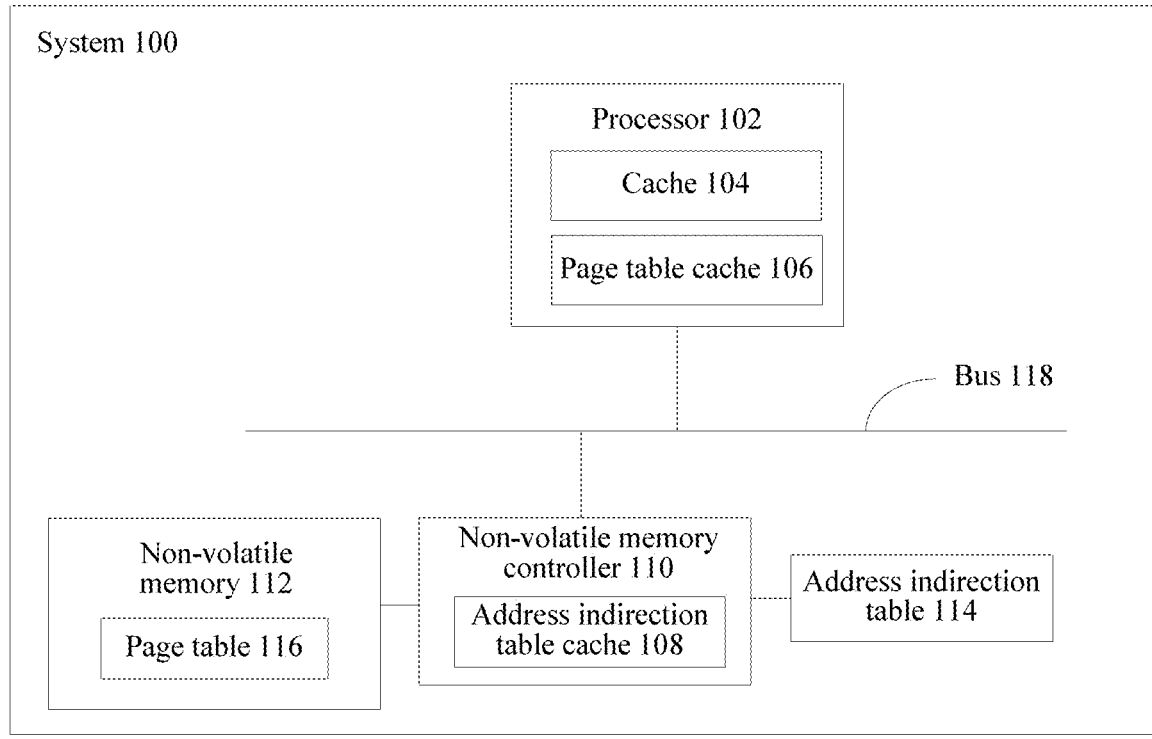
FIG. 1 is a schematic diagram of a logical structure of a system according to an embodiment of the present invention.

The following describes the embodiments of the present invention with reference to accompanying drawings.

In a computer system, a system application uses a virtual address of a memory. When accessing the memory, a processor needs to map the virtual address to a physical address. More specifically, the processor needs to convert a virtual page number in the virtual address into a physical page number. A page table stores the physical page number corresponding to the virtual page number. The processor may index, in the page table based on the virtual address (or a field of the virtual address), the physical page number corresponding to the virtual page number.

The page table is usually stored in the memory, and access to the page table once needs access to the memory once. To reduce a page table access delay, the processor caches some frequently-used mapping relationships between virtual page numbers and physical page numbers by using a translation lookaside buffer (TLB). When a mapping relationship that is between a virtual page number and a physical page number and that is required by the processor exists in the TLB, a TLB hit occurs. When the mapping relationship that is between the virtual page number and the physical page number and that is required by the processor is not in the TLB, a TLB miss occurs. In this case, the processor needs to index, in the page table, the physical page number corresponding to the virtual page number.

In a computer system using a non-volatile memory NVM), an access request sent by a processor to an NVM controller carries a to-be-accessed physical address. After receiving the access request sent by the processor, the NVM controller further needs to convert the to-be-accessed physical address into an actual NVM device address, and performs memory access based on the NVM device address. More specifically, the NVM controller performs management and mapping on a physical address space and an NVM device address space in units of blocks. The NVM controller needs to convert a physical block number in the physical address into an NVM inner block number. An address indirection table (AIT) stores a correspondence between the physical block number and the NVM inner block number. The NVM controller may index, in the AIT based on the physical address (or a partial field of the physical address), the NVM inner block number corresponding to the physical block number. For ease of description, in the embodiments of the present invention, a mapping relationship between the physical address and the NVM device address may be specifically a mapping relationship between the physical block number and the NVM inner block number.

Similarly, to reduce an AIT access delay, the NVM controller uses an AIT cache to cache some frequently-used mapping relationships between physical addresses and NVM device addresses. When a mapping relationship that is between a physical address and an NVM device address and that is required by the NVM controller exists in the AIT cache, an AIT cache hit occurs. When the mapping relationship that is between the physical address and the NVM device address and that is required by the NVM controller does not exist in the AIT cache, an AIT cache miss occurs. In this case, the NVM controller needs to query the AIT for the NVM device address corresponding to the physical address.

Each time an AIT cache miss occurs, access of the NVM controller to the AIT causes a great delay to memory access. To reduce AIT cache misses, in the embodiments of the present invention, the NVM controller listens to an access event of the processor for the page table. When detecting that the processor is to access the page table, the NVM controller determines, based on a page table entry accessed by the processor, a to-be-accessed physical page number. If an NVM inner block number corresponding to a to-be-accessed physical page does not exist in the AIT cache, the NVM controller determines an AIT entry corresponding to the to-be-accessed physical page number, and caches the AIT entry to the AIT cache. More specifically, the NVM controller determines an AIT entry corresponding to a physical block in which the to-be-accessed physical page is located, and caches the AIT entry to the AIT cache. The AIT entry records a mapping relationship between the physical block number and the NVM inner block number. In this way, subsequent AIT cache misses are reduced or avoided, thereby reducing a memory access delay of the NVM.

For ease of description, in the embodiments of the present invention, a virtual address, a physical address, and an NVM device address are used to describe a plurality of solutions. However, it should be understood that, the virtual address may be a partial field of an actual virtual address, the physical address may be a partial field of an actual physical address, and the NVM device address may also be a partial field of an actual NVM device address. For example, a virtual page number is a field of the virtual address, a physical page number is a partial field of the physical address, a physical block number is also a partial field of the physical address, and an NVM inner block number is a partial field of the NVM device address.

FIG. 1 is a schematic diagram of a logical structure of a system 100 according to an embodiment of the present invention. As shown in FIG. 1, the system 100 includes a processor 102, a cache 104, a page table cache 106, an address indirection table cache 108, a non-volatile memory controller 110, a non-volatile memory 112, an address indirection table 114, a page table 116, and a bus 118.

The page table 116 stores a physical page number corresponding to a virtual page number of the system.

The page table cache 106 stores a mapping relationship that is between a virtual page number and a physical page number and that is frequently used by the system. The page table cache 106 may be configured inside or outside the processor 102, and is connected to the processor 102 by using the bus 118.

The address indirection table 114 stores a mapping relationship between a physical address of the system and an NVM device address. The AIT 114 may be stored in a storage space independent of the non-volatile memory 112 and is not transparent to the processor 102. For example, the AIT 114 may be stored in a dynamic random access memory (Dynamic Random Access Memory, DRAM) mounted on the NVM controller 110. However, it should be understood that, this embodiment of the present invention does not limit a storage form of the AIT 114. In some implementations, the AIT 114 is directly stored in an independent storage space in the NVM 112.

The address indirection table cache 108 stores a mapping relationship that is between a physical address and an NVM device address and that is frequently used by the system. Data stored in the address indirection table cache 108 is a subset of data stored in the address indirection table 114.

More specifically, a mapping relationship that is between a physical address and an NVM device address and that is stored in the AIT 114 or the AIT cache 108 is a mapping relationship between a physical block number and an NVM inner block number.

The processor 102 may include one or more processor cores, and is configured to execute a computer program instruction of the system 100. The processor 102 may be specifically implemented in a form of a general central processing unit (CPU), a microprocessor, an application-specific integrated circuit (ASIC), one or more integrated circuits, or the like.

Unless otherwise stated, in the present invention, a component, for example, the processor 102, configured to perform a particular function may be implemented by configuring a general component to perform a corresponding function or by using a dedicated component for specially performing the particular function. This is not limited in this application.

The cache 104 may include a one-level or multi-level cache. For example, the cache 104 may include a one-level (Lo) cache and a two-level (L1) cache.

The non-volatile memory controller 110 is configured to process an access operation on the NVM 112. The memory controller may be specifically implemented in a form of a general processor, a microprocessor, an application-specific integrated circuit, one or more integrated circuits, or the like.

The non-volatile memory 112 may be directly connected to the non-volatile memory controller 110, as shown in FIG. 1, or may be directly connected to the bus 118 and is connected to the non-volatile memory controller 118 by using the bus 118. This is not limited in this embodiment of the present invention.

A request, for example, memory reading, memory writing, or prefetching, related to memory access and generated by the processor 102 is executed by the non-volatile memory controller 110.

When the processor 102 runs a memory access instruction, it is first queried whether a physical address corresponding to a virtual address to be accessed according to the memory access instruction is included in the TLB 106. If a mapping relationship between the virtual address to be accessed according to the memory access instruction and the physical address is found in the TLB 106, a TLB hit occurs, and a memory access request in which the to-be-accessed physical address is included is transmitted. If a TLB miss occurs, the processor needs to search the page table 116 for a physical page number corresponding to a to-be-accessed virtual page number.

Some mapping relationships between physical addresses and NVM device addresses are maintained in the AIT cache 108. After receiving the access request of the processor 102, the NVM controller 110 first searches the AIT cache 108 for a mapping relationship between the to-be-accessed physical address and an NVM device address. If an MT cache hit occurs, the NVM controller 110 accesses the NVM memory 112 based on the obtained NVM device address. If an AIT miss occurs, the NVM controller 110 needs to query the AIT 114 to obtain the mapping relationship between the to-be-accessed physical address and the NVM device address.

Figure 2:
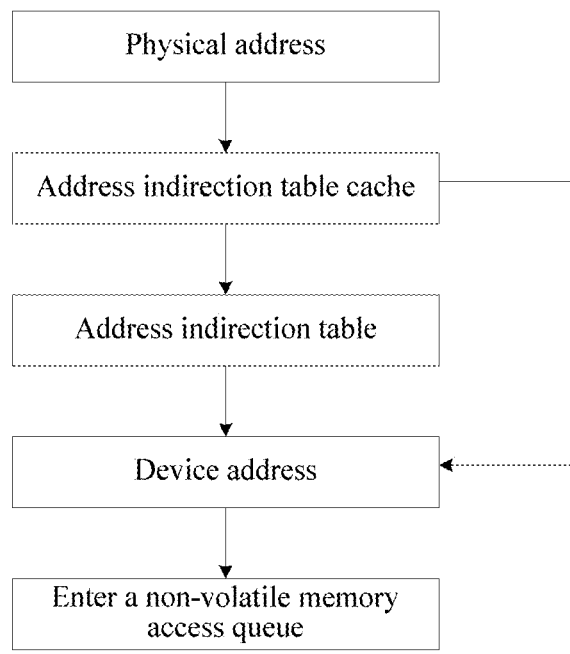
FIG. 2 is a schematic flowchart of address conversion according to an embodiment of the present invention.

As shown in FIG. 2, after receiving the access request sent by the processor 102, the NVM controller 110 first searches the AIT cache 108 for an NVM inner block number corresponding to a physical block number. If the AIT cache hit occurs, after determining the NVM device address based on the NVM inner block number and a partial field of address information carried in the access request, the NVM adds the access request to an NVM access queue. If the AIT cache miss occurs, the NVM controller 110 needs to search the AIT table 114 for the NVM inner block number corresponding to the physical block number, then determines the NVM device address based on the NVM inner block number and the partial field of the address information carried in the access request, and adds the access request to the NVM access queue. As can be learned from FIG. 2, if the AIT cache miss occurs, the NVM controller 110 needs to access the AIT table 114 for one more time. Access to the AIT table 114 is much more time-consuming than access to the AIT cache 108, so that a memory access speed is affected.

Optionally, the system 100 includes an input/output interface and a communications interface (not shown in FIG. 1). The input/output interface is configured to: receive input data and information, and output data such as an operation result. The communications interface uses a transceiver apparatus, for example, but not limited to a transceiver, to implement communication between the system 100 and another device or a communications network.

The bus 118 is configured to transmit information between parts of the system 100.

It should be noted that, although the system 100 shown in FIG. 1 merely shows the processor 102, the cache 104, the page table cache 106, the address indirection table cache 108, the non-volatile memory controller 110, the non-volatile memory 112, the address indirection table 114, the page table 116, and the bus 118, in a specific implementation process, persons skilled in the art should understand that the system 100 further includes other devices necessary for implementing normal running.

In addition, based on a specific requirement, persons skilled in the art should understand that the system 100 may further include a hardware device for implementing another additional function. Moreover, persons skilled in the art should understand that the system 100 may alternatively include only components necessary for implementing this embodiment of the present invention and not necessarily include all devices shown in FIG. 1.

Figure 3:
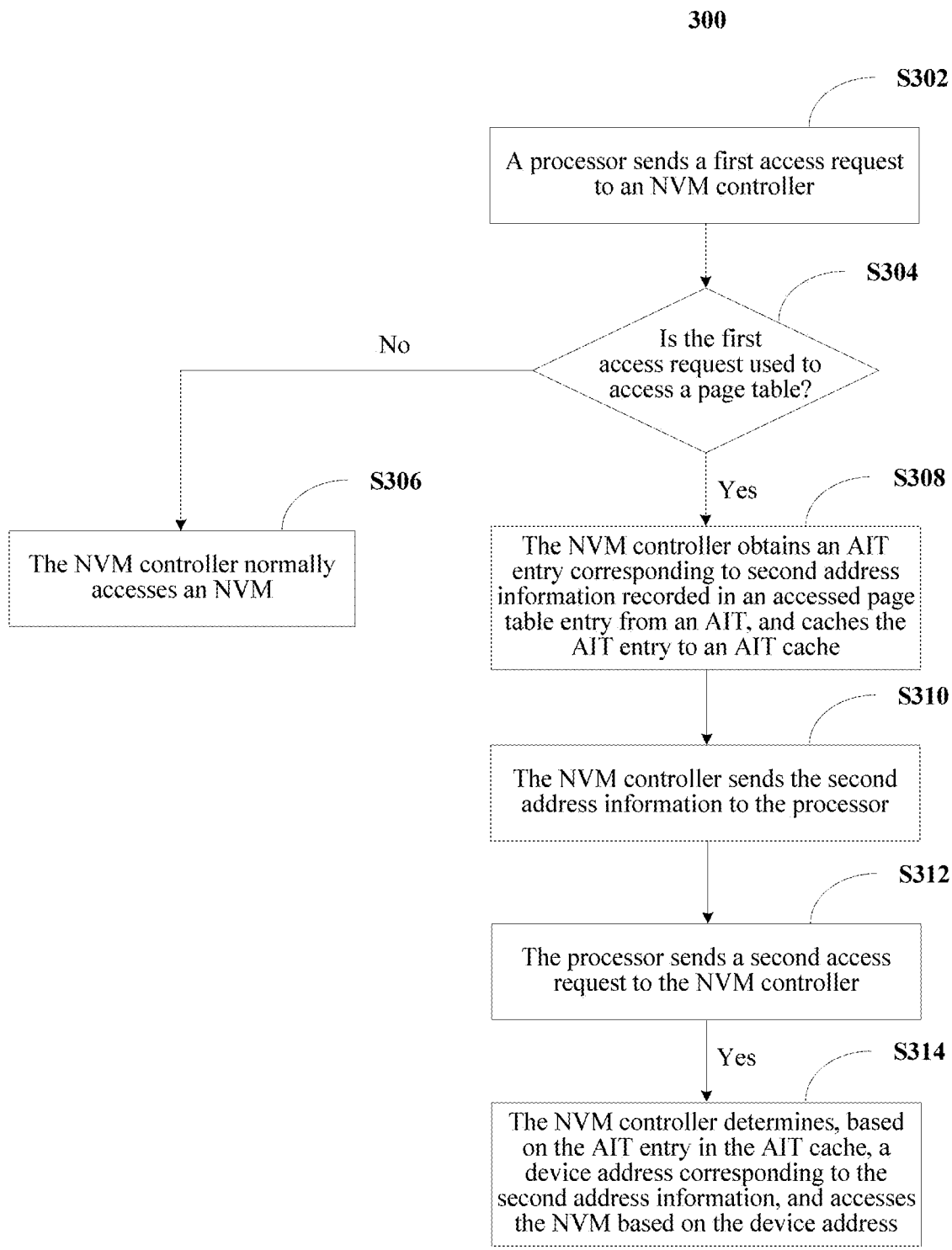
FIG. 3 is a schematic flowchart of a method for accessing a non-volatile memory according to an embodiment of the present invention.

FIG. 3 shows a method for accessing an NVM according to an embodiment of the present invention. As shown in FIG. 3, the method 300 includes the following steps.

S302: A processor sends a first access request to an NVM controller.

The first access request carries a first address information.

Specifically, the first address information is a physical address. The first address information may be a physical address of to-be-accessed memory data or a physical address of a page table entry.

When a cache miss occurs in the processor, when needing to access the memory data, and before sending an access request to the NVM controller, the processor needs to convert a virtual address into a physical address. The processor searches a TLB for a physical page number corresponding to a virtual page number. The virtual page number may be a partial field (such as a high-order field) of the virtual address of the memory data. If a TLB hit occurs, the processor obtains the physical page number of the memory data from the TLB, and determines the physical address of the to-be-accessed memory data based on the physical page number and by using a partial field (such as a low-order field) of the virtual address as an offset.

When a TLB miss occurs, the processor determines, based on the partial field of the virtual address of the memory data and a page table base address, a physical address of a page table entry that stores the physical page number, and sends an access request to the NVM controller. The access request carries the physical address of the page table entry.

For a single-level page table, the processor may obtain, from the single-level page table by using an access request, a physical page number corresponding to a virtual page number of to-be-accessed memory data. More specifically, the processor may determine, based on a page table base address and by using a partial field (such as a high-order field or the virtual page number) of a virtual address of the memory data as an offset, a physical address of a page table entry that stores the physical page number, and reads, based on the physical address of the page table entry, the physical page number corresponding to the virtual page number recorded in the page table entry. After reading the physical page number, the processor determines a physical address of the memory data by using the physical page number and a partial field (such as a low-order field) of the virtual address as an offset, and accesses the memory data based on the physical address of the memory data.

The page table base address may be stored in a dedicated register. For example, the page table base address may be stored in a control register CR3, and the CR3 includes a page-directory table physical memory base address. Therefore, the register is also referred to as a page-directory base address register (PDBR).

For a multi-level page table, the physical page number corresponding to the virtual page number of the to-be-accessed memory data can be obtained only after the processor sends an access request to the NVM controller for a plurality of times based on a level quantity of the page table.

Figure 4:
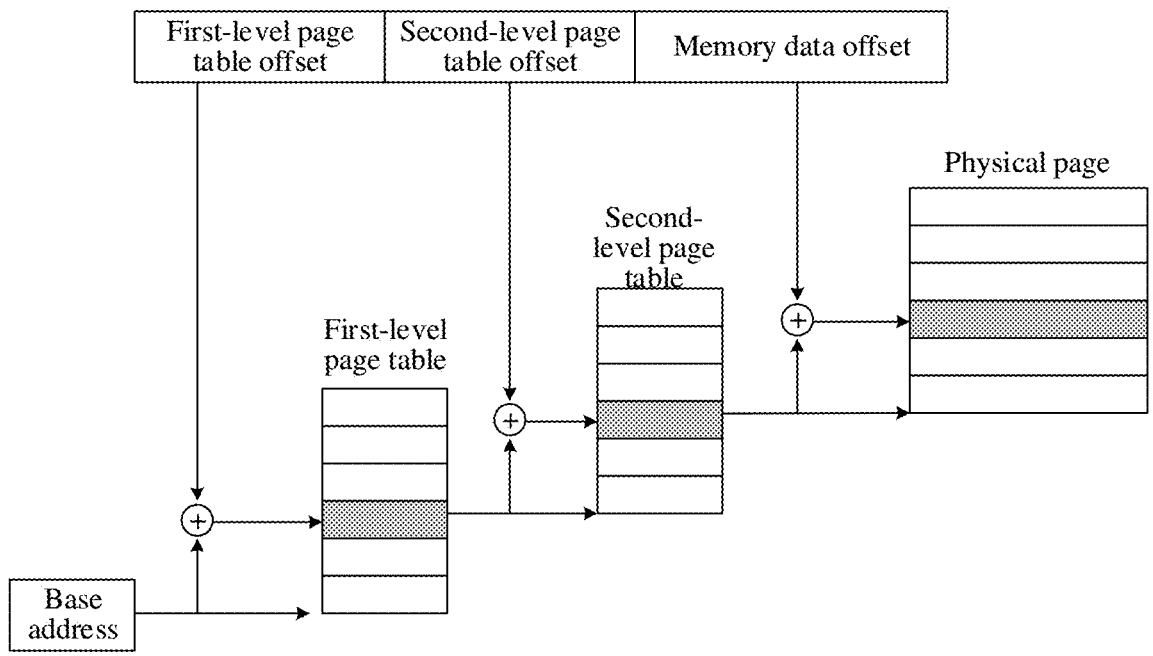
FIG. 4 is a schematic flowchart of access to a two-level page table according to an embodiment of the present invention.

For example, when the page table includes two levels, as shown in FIG. 4, an entry of a first-level page table points to a second-level page table, and an entry of the second-level page table records the physical page number corresponding to the virtual page number of the memory data. The processor determines a physical address A based on a base address of the first-level page table stored in the register CR3 and by using a field of a virtual address (such as M high-order bits of the virtual address) of the memory data as an offset, and sends an access request based on the determined physical address A. Data read from the physical address A is a base address of the second-level page table. Then the processor determines a physical address B based on the base address of the second-level page table and by using a field of the virtual address (such as N middle-order bits of the virtual address) as an offset, and sends an access request based on the physical address B. Data read from the physical address B is a page table entry of the second-level page table. The page table entry records the physical page number corresponding to the virtual page number of the to-be-accessed memory data. The processor determines, based on the physical page number and by using a field of the virtual address (such as L low-order bits of the virtual address) as an offset, a physical address of the to-be-accessed memory data.

S304: After receiving the first access request, the NVM controller determines, based on the first address information, whether the first access request is used to access a page table; and if the first access request is not used to access the page table, step S306 is performed; or if the first access request is used to access the page table, step S308 is performed.

Before step S304, the method 300 further includes: receiving, by the NVM controller, page table address information from the processor, where the NVM controller may determine, based on the page table address information, whether a received access request is used to access the page table.

The page table address information may include an address stored in the register CR3 or an address of the register CR3. The register CR3 is configured to store a page table base address.

The TLB miss inevitably triggers an exception of the processor. The processor may send an address of a register CR3 of a process that leads to the TLB miss or an address stored in the register CR3 to the NVM controller in an exception processing program. The NVM controller tracks access to the page table based on the base address stored in the CR3.

When establishing a new process, the processor may alternatively send an address of a register CR3 corresponding to the process or an address stored in the register CR3 to the NVM controller.

The page table address information may further include information such as a level quantity of the page table, a parsing manner of each level of the page table, and a size of each page. In this way, the NVM controller may determine, based on the page table address information, whether the access request is access to the page table. For the multi-level page table, access to each level of the page table may be tracked based on the page table address information until the physical page number of the to-be-accessed memory data is obtained.

Further, there may be many application processes, and the NVM controller can store only a limited amount of page table address information. When an amount of page table address information sent by the processor is greater than an amount of page table address information that can be stored in the NVM controller, replacement may be performed based on an algorithm. For example, a part of the page table address information may be reserved based on a replacement policy such as least recently used (Least Recently Used, LRU) or least frequently used (Least Frequently Used, LFU).

The NVM controller determines, based on the first address information and the page table address information, whether the first access request is used to access the page table. Specifically, the NVM controller may determine, by determining whether the first address information falls within a range of the page table address information, whether the first access request is used to access the page table. If the first address information falls within the range of the page table address information, it indicates that the first access request is used to access the page table. If the first address information does not fall within the range of the page table address information, it indicates that the first access request is used to access normal memory data instead of the page table.

The NVM controller determines a page table size based on a quantity of page table entries and a size of each page table entry. An address range of the page table is: [page table base address, page table base address+page table size). The NVM controller determines, based on the result that whether the first address information falls within the address range of the page table, whether the first access request is used to access the page table. If the first address information falls within the address range of the page table, the first access request is used to access the page table.

For a multi-level page table, a base address of a first-level page table is stored in a control register, a base address of a second-level page table is stored in a page table entry of the first-level page table, and so on, until a base address of a last-level page table is obtained and the physical page number of the to-be-accessed memory data is obtained from the last-level page table.

The NVM controller may alternatively determine, based on a partial field (such as a high-order field) of the first address information and the page table base address, whether the first access request is used to access the page table. If the partial field of the first address information is the same as the page table base address maintained by the NVM controller, it indicates that the first address information falls within the range of the page table address information and that the first access request is used to access the page table.

S306: The NVM controller performs a normal access operation on the NVM based on the first access request.

If the first access request is not used to access the page table, the first address information is the physical address of the to-be-accessed memory data, and the NVM controller normally accesses the NVM based on the first access request.

Specifically, the NVM controller searches, based on the first address information, an AIT cache for an NVM device address corresponding to the first address information. More specifically, the NVM controller searches the AIT cache for an NVM inner block number corresponding to a physical block number indicated by the first address information (such as a high-order field of the first address information), and accesses the NVM based on the NVM inner block number and the first address information (such as a low-order field of the first address information).

S308: The NVM controller obtains, based on a second address information recorded in a page table entry indicated by the first address information, an AIT entry corresponding to the second address information from an AIT, and caches the AIT entry to an AIT cache.

If the first access request is used to access the page table entry, it indicates that the TLB miss occurs in the processor. The first access request is used to obtain a physical page number corresponding to a virtual page number of to-be-accessed data, and the first address information is a physical address of the page table entry that stores the physical page number.

The NVM controller reads, based on the first address information, the second address information recorded by the page table entry. The second address information is specifically a physical page number. If the AIT entry corresponding to the second address information does not exist in the AIT cache, the NVM controller obtains the AIT entry corresponding to the second address information from the AIT, and caches the AIT entry to the AIT cache for subsequent use.

The second address information may correspond to one or more AIT entries. More specifically, the AIT entry corresponding to the second address information is an AIT entry corresponding to one or more physical block numbers distributed in a physical page indicated by the second address information.

1. If a size of the physical page is consistent with a size of a physical block (for example, both of which are 4 KB), one physical page number may correspond to one physical block number, so that one physical block number may correspond to one AIT entry, and an NVM inner block number corresponding to the physical page number may be directly indexed by using the physical page number. If the sizes of the physical page and the physical block are the same, a system may describe the physical page number and the physical block number based on a same field of a physical address. That is, the system indexes the physical page and the physical block by using the same field (such as a high-order field) of the physical address. For example, it is assumed that the physical address includes 32 bits, and 16 high-order bits are used to indicate the physical page number and the physical block number, the 16 high-order bits of the physical address can be used not only as an index of the physical page but also as an index of the physical block number.

2. If the physical page is larger than the physical page, one physical page number may correspond to a plurality of physical block numbers, so that one physical page may correspond to a plurality of AIT entries, and a plurality of AIT entries corresponding to the physical page number need to be obtained from the AIT. For example, the physical address includes 32 bits. 16 high-order bits of the 32 bits are used to indicate the physical page number, and 18 high-order bits are used to indicate the physical block number. In other words, the 16 high-order bits of the physical address are used as an index of the physical page, and the 18 high-order bits are used as an index of the physical block number. One physical page corresponds to four physical blocks. In this case, four AIT entries corresponding to the physical page number need to be obtained from the AIT.

3. If the physical page is smaller than the physical block, a plurality of physical page numbers may correspond to a same physical block number. The last several bits of the physical page number may be ignored, and the remaining bits are used as an index of a corresponding AIT table. For example, the physical address includes 32 bits. 16 high-order bits of the 32 bits are used to indicate the physical block number, and 18 high-order bits are used to indicate the physical page number. In other words, the 16 high-order bits of the physical address are an index of a physical block, and the 18 high-order bits are an index of the physical page. One physical block corresponds to four physical pages. In this case, when AIT indexing is performed, the last two bits of the physical page number are ignored.

S310: The NVM controller sends the second address information to the processor.

The physical page indicated by the second address information is a physical page to be accessed by the processor. After obtaining the second address information, the NVM controller sends the second address information to the processor.

The second address information may be the physical page number of the to-be-accessed memory data. For a multi-level page table, the second address information may alternatively be a base address of a second-level page table.

S312: The processor sends a second access request to the NVM controller, where the second access request carries the second address information.

Because the TLB miss occurs, after the processor receives the second address information (the physical page number), if the second address information is the physical page number of the to-be-accessed memory data, the processor further stores a correspondence between the virtual page number of the to-be-accessed memory data and the second address information in the TLB for subsequent use.

Specifically, the processor determines a physical address based on the second address information and by using a field of the virtual address of the to-be-accessed memory data as an offset, and adds the physical address to the second access request.

S314: The NVM controller determines, based on the second address information of the received second access request and the AIT entry that is pre-stored in the AIT cache, an NVM device address corresponding to the second address information, and accesses the NVM based on the NVM device address corresponding to the second address information.

In step S308, the NVM controller already stores, in the AIT cache, the AIT entry corresponding to the second address information. Therefore, after receiving the second access request, the NVM controller may directly find, in the AIT cache, the AIT entry corresponding to the second address information. The AIT entry records an NVM inner block number to be accessed by the second access request.

The second access request carries the physical address determined by the processor by using the second address information as a base address and a partial field of the to-be-accessed memory data as an offset. The NVM controller determines an NVM inner block number corresponding to the number of a physical block in which a physical page indicated by the second address information is located, and determines an NVM inner address based on the NVM inner block number and by using a partial field of the physical address as an offset.

When the page table is a multi-level page table, the second access request may also be used to access the page table. For example, the first access request is used to access a first-level page table, and the second access request is used to access a second-level page table. The method 300 may further include: determining, by the NVM controller based on the second address information, whether the second access request is used to access the page table; and if the second access request is used to access the page table, deleting, by the NVM controller, the AIT entry corresponding to the second address information from the AIT cache after obtaining, based on the second address information and the AIT entry that corresponds to the second address information and that is stored in the AIT cache, the NVM device address corresponding to the second address information. The deletion includes: using the AIT entry corresponding to the second address information as a replacement alternative to another AIT entry.

For access to the multi-level page table, after the physical page number corresponding to the virtual page number of the to-be-accessed memory data is obtained, the processor stores, in the TLB, a correspondence between the virtual page number and the physical page number. Subsequently, the processor can directly obtain, from the TLB, the physical page number corresponding to the to-be-accessed virtual page number. Therefore, for access to the page table, reusability of the AIT is not high. When the access ends, an AIT entry that is no longer used and that is related to the page table may be deleted, to reduce AIT cache pollution.

In another implementation, the NVM controller may cache the AIT entry related to the page table by using some dedicated cache blocks, to reduce AIT cache pollution.

Optionally, the method 300 further includes: sending, by the processor after destructing a process, a page table invalidity message to the NVM controller, and invalidating, by the NVM controller after receiving the page table invalidity message from the processor, page table address information related to the process.

According to the technical solutions disclosed in this embodiment of the present invention, the NVM controller monitors access of the processor to the page table. When obtaining a request of the processor for accessing the page table, the NVM controller parses content of the page table to obtain a physical page number that may be subsequently accessed, prefetches an AIT entry corresponding to the physical page number from the AIT before the processor really accesses the physical page number, and caches the prefetched AIT entry to the AIT cache. In this way, subsequent AIT cache misses are reduced, thereby increasing a data access speed of the NVM.

Figure 5:
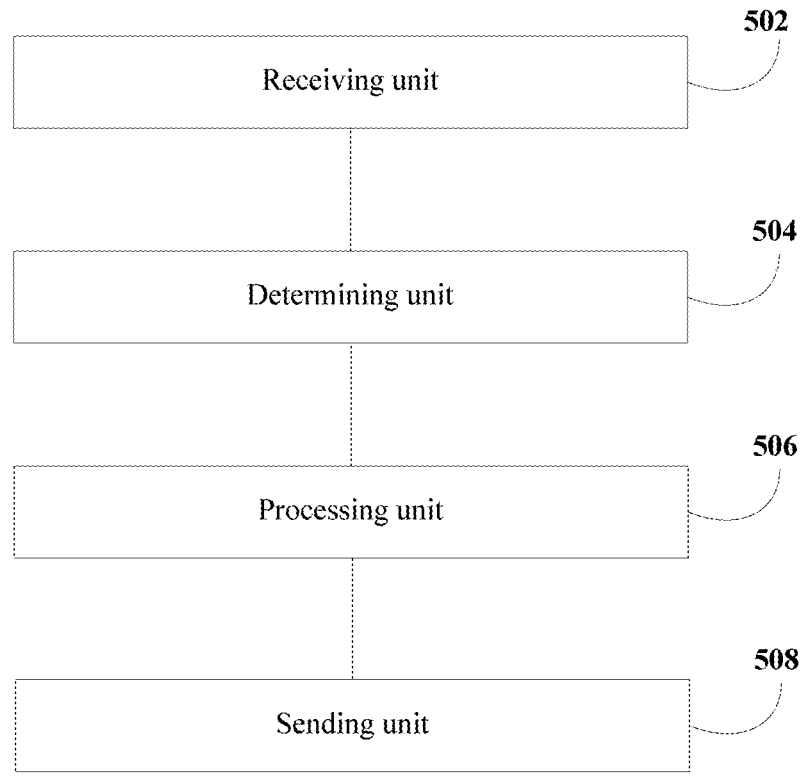
FIG. 5 is a schematic diagram of a logical structure of an apparatus for accessing a non-volatile memory according to an embodiment of the present invention.

FIG. 5 is a schematic diagram of a logical structure of an apparatus 500 for accessing a non-volatile memory according to an embodiment of the present invention. As shown in FIG. 5, the apparatus 500 includes a receiving unit 502, a determining unit 504, a processing unit 506, and a sending unit 508.

The receiving unit 502 is configured to receive a first access request from a processor, where the first access request carries first address information.

The determining unit 504 is configured to determine, based on the first address information, whether the first access request is used to access a page table.

If the first access request is used to access the page table, the processing unit 506 is configured to: obtain, from an address indirection table AIT based on second address information recorded in a page table entry indicated by the first address information, an AIT entry corresponding to the second address information, and cache the AIT entry to an AIT cache, where the AIT is used to record a mapping relationship between a physical information and an NVM device address.

The sending unit 508 is configured to send the second address information to the processor. The receiving unit 502 is further configured to receive a second access request from the processor, where the second access request carries the second address information. The processing unit 506 is further configured to: obtain, based on the second address information and the AIT entry in the AIT cache, an NVM device address corresponding to the second address information, and access the NVM based on the NVM device address corresponding to the second address information.

Optionally, the determining unit 504 is further configured to determine, based on the second address information, whether the second access request is used to access the page table. If the second access request is used to access the page table, the processing unit 506 is further configured to delete the AIT entry from the AIT cache after obtaining the NVM device address corresponding to the second address information.

The receiving unit 502 is further configured to receive page table address information from the processor. The determining unit 504 is configured to determine, based on the first address information and the page table address information, whether the first access request is used to access the page table.

Optionally, the receiving unit 502 is further configured to receive page table invalidity information from the processor. The processing unit 506 is further configured to invalidate the page table address information based on the page table invalidity information.

This embodiment of the present invention is an apparatus embodiment of the NVM controller. Feature descriptions of the embodiments of FIG. 1 to FIG. 4 are applicable to this embodiment of the present invention. Details are not described herein again.

Figure 6:
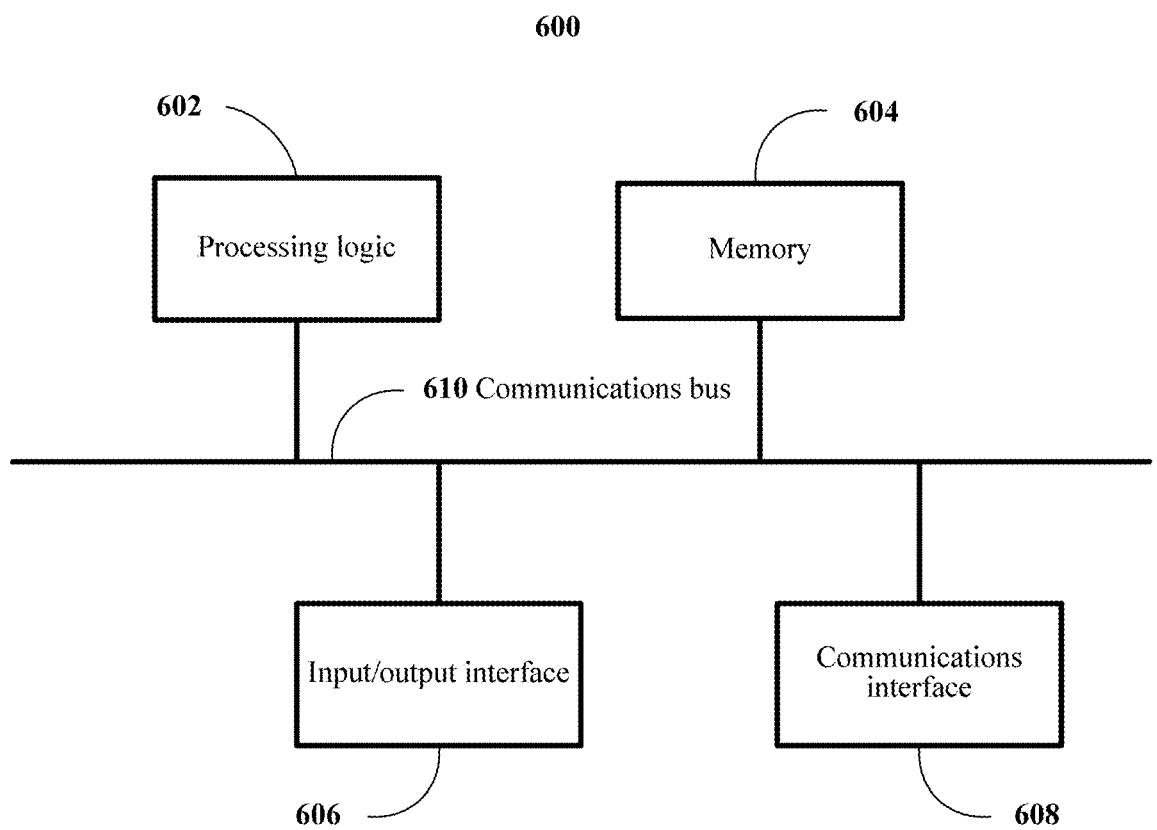
FIG. 6 is a schematic diagram of a hardware structure of an apparatus for accessing a non-volatile memory according to an embodiment of the present invention.

FIG. 6 is a schematic diagram of a hardware structure of an apparatus 600 for accessing a non-volatile memory according to an embodiment of the present invention. As shown in FIG. 6, the apparatus 600 includes a processing logic 602, a memory 604, an input/output interface 606, a communications interface 608, and a bus 610. Communication connection between the processing logic 602, the memory 604, the input/output interface 606, and the communications interface 608 is implemented by using the bus 610.

The processing logic 602 is a control center of the apparatus 600, and configured to implement technical solutions provided in this embodiment of the present invention. The processing logic 602 may be a general purpose processor, a microprocessor, an application-specific integrated circuit, or one or more integrated circuits to implement the technical solutions provided in this embodiment of the present invention.

More specifically, if the processing logic 602 is implemented by using the processor, the processing logic is configured to execute program code in the memory 604, to implement the technical solutions provided in this embodiment of the present invention.

The memory 604 may be a read-only memory (Read-Only Memory, ROM), a static storage device, a dynamic storage device, or a random access memory (Random Access Memory, RAM). When the technical solutions provided in this embodiment of the present invention are implemented by using software or firmware, the program code used to implement the technical solutions provided in this embodiment of the present invention is stored in the memory 604, and is executed by the processing logic 602. The memory 604 may be integrated with the processing logic 602 or integrated inside the processing logic 602, or may be one or more storage units independent of the processing logic 602.

The program code executed by the processing logic 602 may be stored in an external storage device connected to the processing logic 602 or in the memory 604. Optionally, the memory 604 is a RAM. The program code stored in the external storage device is copied into the memory 604 to be executed by the processing logic 602.

Unless otherwise stated, in the present invention, a component, for example, the processing logic 602 or the memory 604, configured to perform a particular function may be implemented by configuring a general component to perform a corresponding function or by using a dedicated component for specially performing the particular function. This is not limited in this application.

The input/output interface 606 is configured to: receive input data and information, and output data such as an operation result.

The communications interface 608 uses a transceiver apparatus, for example, but not limited to a transceiver, to implement communication between the apparatus 600 and another device or a communications network.

The bus 610 may include a path that transmits information between parts (such as the processing logic 602, the memory 604, the input/output interface 606, and the communications interface 608) of the apparatus 600.

It should be noted that, although the apparatus 600 shown in FIG. 6 shows merely the processing logic 602, the memory 604, the input/output interface 606, the communications interface 608, and the bus 610, in a specific implementation process, persons skilled in the art should understand that the apparatus 600 further includes other devices necessary for implementing normal running. In addition, based on a specific requirement, persons skilled in the art should understand that the apparatus 600 may further include a hardware device for implementing another additional function. Moreover, persons skilled in the art should understand that the apparatus 600 may alternatively include only devices necessary for implementing this embodiment of the present invention and not necessarily include all devices shown in FIG. 6.

The receiving unit 302 and the sending unit 308 shown in FIG. 3 may be implemented by the processing logic 602 shown in FIG. 6 in combination with the communications interface 608, and more specifically, may be implemented by executing the program code in the memory 604 by the processing logic 602 in combination with the communications interface 608.

The determining unit 504 and the processing unit 506 shown in FIG. 5 may be implemented by the processing logic 602 shown in FIG. 6, and more specifically, may be implemented by executing the program code in the memory 604 by the processing logic 602.

The hardware structure shown in FIG. 6 and the foregoing descriptions are applicable to various apparatuses for accessing a non-volatile memory according to the embodiments of the present invention, and are applicable to various methods for accessing a non-volatile memory according to the embodiments of the present invention.

In the several embodiments provided in this application, it should be understood that the disclosed system, device, and method may be implemented in other manners. For example, the apparatus embodiment described above is merely an example. For example, the module division is merely logical function division and may be other division during implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in an electronic form, a mechanical form, or another form.

The modules described as separate parts may or may not be physically separate, and parts displayed as modules may or may not be physical modules, that is, may be located in one position, or may be distributed on a plurality of network modules. Some or all of the modules may be selected according to actual needs to achieve the objectives of the solutions of the embodiments.

In addition, function modules in the embodiments of the present invention may be integrated into one processing module, or each of the modules may exist alone physically, or two or more modules may be integrated into one module. The integrated module may be implemented in a form of hardware, or may be implemented in a form of hardware in addition to a software function module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a removable hard disk, a read-only memory, a random access memory, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. A method, comprising:
   receiving, by a non-volatile memory (NVM) controller of a NVM, a first access request from a processor, wherein the first access request carries first address information comprising a first physical address of the NVM;
   determining, by the NVM controller based on the first address information, whether the first access request requests to access a page table in the NVM, the page table comprising correspondences between virtual addresses and respective physical addresses of the NVM, and the determining comprising:
   determining, by the NVM controller, whether the first physical address in the first access request is a physical address of a page table entry of the page table, the page table entry comprising a virtual address corresponding to a second physical address; and
   upon determining that the first access request requests to access the page table:
      determining, by the NVM controller, that a cache miss has occurred for obtaining the second physical address;
      reading, by the NVM controller according to the first physical address, the second physical address from the page table entry of the page table;
      obtaining, from an address indirection table (AIT) based on the second physical address, an AIT entry corresponding to the second physical address; and
      caching the AIT entry to an AIT cache, wherein the AIT records one or more mapping relationships between one or more physical addresses and one or more corresponding NVM device addresses.

2. The method according to claim 1, further comprising:
   sending, by the NVM controller, the second physical address to the processor;
   receiving, by the NVM controller, a second access request from the processor, wherein the second access request carries the second physical address;
   obtaining, by the NVM controller based on the second physical address and the AIT entry in the AIT cache, an NVM device address corresponding to the second physical address; and
   accessing the NVM based on the NVM device address corresponding to the second physical address.

3. The method according to claim 2, further comprising:
   determining, by the NVM controller based on the second physical address, whether the second access request is used to access the page table; and
   deleting, by the NVM controller, the AIT entry from the AIT cache after the obtaining the NVM device address corresponding to the second physical address based on determination that the second access request is used to access the page table.

4. The method according to claim 1, further comprising:
   before the determining whether the first access request requests to access the page table:
      receiving, by the NVM controller, page table address information from the processor,
   wherein the determining whether the first access request requests to access the page table comprises:
      determining, by the NVM controller, based on the first address information and the page table address information, whether the first access request requests to access the page table.

5. The method according to claim 4, wherein the method further comprises:
   after the receiving the page table address information from the processor:
      receiving, by the NVM controller, page table invalidity information from the processor; and
      invalidating, by the NVM controller, the page table address information based on the page table invalidity information.

6. The method according to claim 1, wherein the second physical address comprises a physical page number indicating a physical page to be accessed by the processor.

7. The method of claim 6, the obtaining comprising:
   prefetching, by the NVM controller, the AIT entry corresponding to the physical page number.

8. An apparatus, comprising:
   A processor;
   A memory configured to store instructions, wherein the processor executes the instructions stored in the memory to perform:
      receiving, by a non-volatile memory (NVM) controller of a NVM, a first access request from the processor, wherein the first access request carries first address information comprising a first physical address of the NVM;
      determining, by the NVM controller based on the first address information, whether the first access request requests to access a page table in the NVM, the page table comprising correspondences between virtual addresses and respective physical addresses of the NVM, and the determining comprising:
      determining, by the NVM controller, whether the first physical address in the first access request is a physical address of a page table entry of the page table, the page table entry comprising a virtual address corresponding to a second physical address; and
   upon determining that the first access request requests to access the page table:
      determining that a cache miss has occurred for obtaining the second physical address;
      reading, by the NVM controller according to the first physical address, the second physical address from the page table entry of the page table;
      obtaining, from an address indirection table (AIT) based on the second physical address, an AIT entry corresponding to the second physical address; and
      caching the AIT entry to an AIT cache, wherein the AIT records one or more mapping relationships between one or more physical addresses and one or more corresponding NVM device addresses.

9. The apparatus according to claim 8, wherein the processor further executes the instructions stored in the memory to perform:
   sending, by the NVM controller, the second physical address to the processor;
   receiving, by the NVM controller, a second access request from the processor, wherein the second access request carries the second physical address; and obtaining, by the NVM controller based on the second physical address and the AIT entry in the AIT cache, an NVM device address corresponding to the second physical address; and accessing the NVM based on the NVM device address corresponding to the second physical address.

10. The apparatus according to claim 9, wherein the processor further executes the instructions stored in the memory to perform:

determining, by the NVM controller based on the second physical address, whether the second access request is used to access the page table; and deleting, by the NVM controller, the AIT entry from the AIT cache after obtaining the NVM device address corresponding to the second physical address based on determination that the second access request is used to access the page table.

11. The apparatus according to claim 8, wherein the processor further executed the instructions stored in the memory to perform:

before the determining whether the first access request requests to access the page table:
receiving, by the NVM controller, page table address information from the processor,
wherein the determining whether the first access request requests to access the page table comprises:
determining, by the NVM controller based on the first address information and the page table address information, whether the first access request requests to access the page table.

12. The apparatus according to claim 11, wherein the processor further executed the instructions stored in the memory to perform:

after the receiving the page table address information from the processor:
receiving, by the NVM controller, page table invalidity information from the processor; and
invalidating, by the NVM controller, the page table address information based on the page table invalidity information.

13. The apparatus according to claim 8, wherein the second physical address comprises a physical page number indicating a physical page to be accessed by the processor.

14. The apparatus of claim 13, the obtaining comprising:
prefetching, by the NVM controller, the AIT entry corresponding to the physical page number.

15. A non-transitory computer readable medium comprising instructions, wherein a processor executes the instructions to perform:

receiving, by a non-volatile memory (NVM) controller of a NVM, a first access request from the processor, wherein the first access request carries first address information comprising a first physical address of the NVM;

determining, by the NVM controller based on the first address information, whether the first access request requests to access a page table in the NVM, the page table comprising correspondences between virtual addresses and respective physical addresses of the NVM, and the determining comprising:

determining, by the NVM controller, whether the first physical address in the first access request is a physical address of a page table entry of the page table, the page table entry comprising a virtual address corresponding to a second physical address; and upon determining that the first access request requests to access the page table:
determining, by the NVM controller, that a cache miss has occurred for obtaining the second physical address;
reading, by the NVM controller according to the first physical address, the second physical address from the page table entry of the page table;
obtaining, from an address indirection table (AIT) based on the second physical address, an AIT entry corresponding to the second physical address; and
caching the AIT entry to an AIT cache, wherein the AIT is used to record one or more mapping relationships between one or more physical addresses and one or more corresponding NVM device addresses.

16. The non-transitory computer readable medium according to claim 15, wherein the processor further executes the instructions to perform:

sending, by the NVM controller, the second physical address to the processor;
receiving, by the NVM controller, a second access request from the processor, wherein the second access request carries the second physical address; and
obtaining, by the NVM controller based on the second physical address and the AIT entry in the AIT cache, an NVM device address corresponding to the second physical address; and
accessing the NVM based on the NVM device address corresponding to the second physical address.

17. The non-transitory computer readable medium according to claim 16, wherein the processor further executes the instructions to perform:

determining, by the NVM controller based on the second physical address, whether the second access request is used to access the page table; and
deleting, by the NVM controller, the AIT entry from the AIT cache after obtaining the NVM device address corresponding to the second physical address based on determination that the second access request is used to access the page table.

18. The non-transitory computer readable medium according to claim 15, wherein the processor further executes the instructions to perform:

before the determining whether the first access request requests to access the page table:
receiving, by the NVM controller, page table address information from the processor,
wherein the determining whether the first access request requests to access the page table comprises:
determining, by the NVM controller based on the first address information and the page table address information, whether the first access request requests to access the page table.

19. The non-transitory computer readable medium according to claim 18, wherein the processor further executes the instructions to perform:

after the receiving the page table address information from the processor:
receiving, by the NVM controller, page table invalidity information from the processor; and
invalidating, by the NVM controller, the page table address information based on the page table invalidity information.

20. The non-transitory computer readable medium according to claim 18, wherein the second physical address comprises a physical page number indicating a physical page to be accessed by the processor, the obtaining comprising:

prefetching, by the NVM controller, the AIT entry corresponding to the physical page number.

* * * * *